March 9, 1965 G. HERMAN ETAL 3,172,158
APPARATUS FOR REPAIRING THE WALLS OF TIRES
Filed Sept. 5, 1963 2 Sheets-Sheet 1
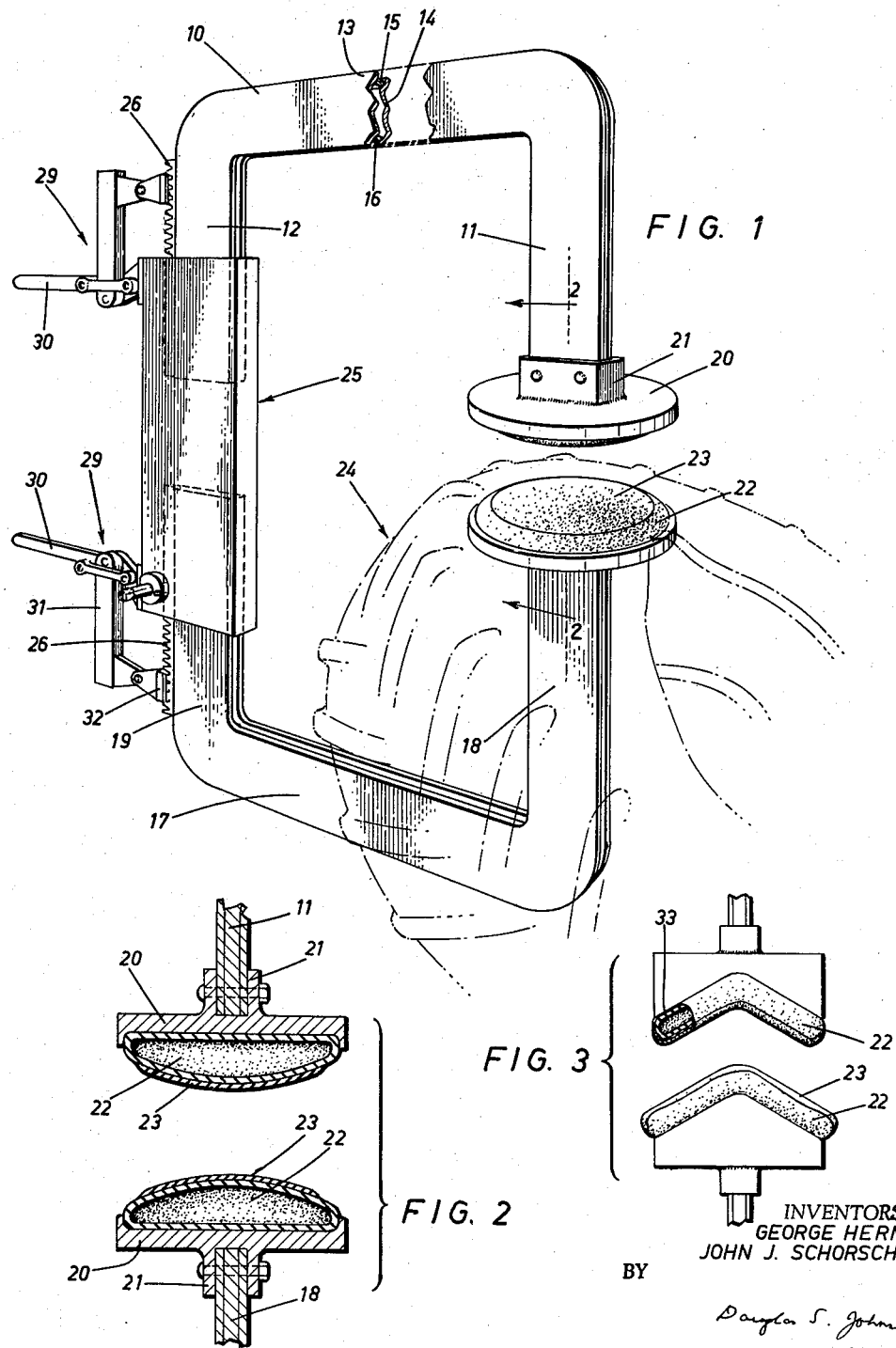
FIG. 1
FIG. 2
FIG. 3
INVENTORS
GEORGE HERMAN
JOHN J. SCHORSCHER
BY
Attorney March 9, 1965
G. HERMAN ETAL
3,172,158
APPARATUS FOR REPAIRING THE WALLS OF TIRES
Filed Sept. 5, 1963
2 Sheets-Sheet 2
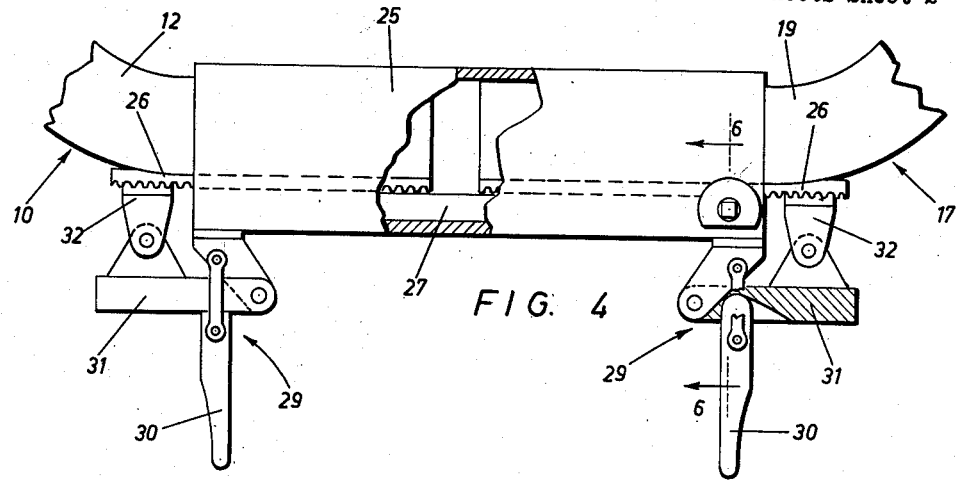
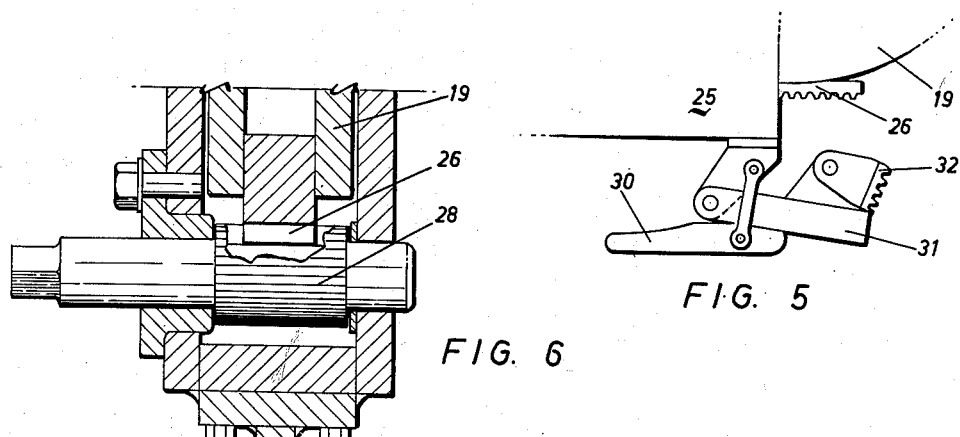
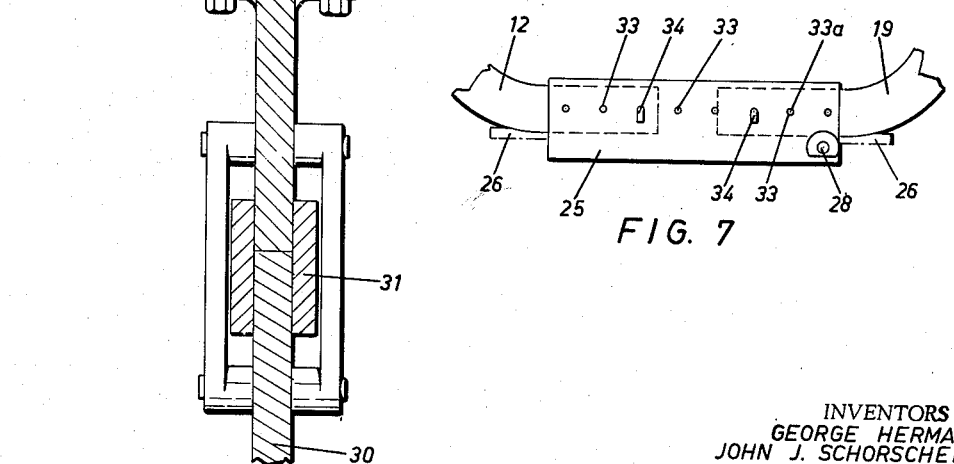
INVENTORS
GEORGE HERMAN
JOHN J. SCHORSCHER
BY
Douglas S. Johns
Attorney

United States Patent Office 3,172,158
Patented Mar. 9, 1965

3,172,158
APPARATUS FOR REPAIRING THE
WALLS OF TIRES
George Herman, 273 Ellerslie Ave., Willowdale, Ontario,
Canada, and John J. Schorscher, R.R. 1, Downsview,
Ontario, Canada
Filed Sept. 5, 1963, Ser. No. 306,810
Claims priority, application Canada, July 25, 1963,
880,986
7 Claims. (Cl. 18—18)

The present invention relates to apparatus for repairing tires and the particular object of the invention is to provide new and improved apparatus of such character.

The walls of tires are frequently in need of repair due to cuts which may completely pierce the walls thus introducing the possibility of blowout of the inner tube or if the cuts are not of this extent they are at least sufficient to render the walls too weak to give the requisite support. A known procedure of repair is to excise a sufficient area around the cut in the wall to provide an opening having a substantially circular cone shaped configuration, the base of the cone being on the inside of the tire, after which a correspondingly shaped plug of uncured rubber is inserted into the opening. The tire is then placed on a mandril having walls of substantially the same configuration as that of the tire and to cure the plug in the tire a pad, usually heated by electrical means, is placed against the inside of the tire and superimposed over the plug of uncured rubber.

When the plug is being cured by the heat evolved from the pad it is then the practice to apply pressure against the heating pad to ensure that during the curing process the plug will be pressed against the walls of the opening and thereby effect the requisite bond. Various methods of applying this pressure have been employed but the most suitable hitherto devised has been an inflatable air bag positioned inside the tire, which on inflation will bear uniformly against the tire walls. The air bag is recessed in the region where it lies between the rims of the tires and a suitably dimensioned member is inserted into the recess so that the air bag will be retained in position on inflation inside the tire and not expelled.

It is a defect of the above method that the desirability of applying uniform pressure to the walls of the tires is only achieved on the one side where the air bag is located, and it has been found that after a certain amount of curing has taken place the mandril comes to rest on the tire casing around the plug and does not contribute properly to maintain the proper vulcanizing pressure. Furthermore, since the curing takes place only from the inside to the outside of the tire, voids have frequently been found to occur in the plug at locations between the inner and outer walls of the tire. Again the efficiency of the above method is somewhat dependent on the provision of a cone shaped aperture and unless the proper care is taken the bond which results on curing may well be deficient.

Again since a shaped mandril is employed to support the tire during the operations described above it will be appreciated that the wide range of tire sizes now in use will also necessitate a range of mandril sizes, though, of course, some latitude in the use of a particular mandril size is permissible due to the fact that the inflatable air bag will take up some of the difference from size to size of the tires. However, the mandrils have to be of sturdy construction to provide the requisite support with the result that they are not readily portable, this being particularly the case with tires of the size used in earth and rock moving equipment, and hence it is more convenient to station the mandrils at one centre to which the tires may be brought for repair. However, since the incidence of breaks in the tire walls is particularly high where they are used for rock moving operations frequently conducted in areas considerably removed from the centres at which the mandrils are stationed, it would clearly be an advantage if apparatus were developed of a portable nature to enable the operators in the field to repair the walls of such tires either on the site or at least in a conveniently close location where electrical supply is available for connection to the heating pad. A particularly beneficial result of being able to undertake the repairs on site is the reduction in the stock of tires held as replacements.

In contrast with the prior art the present invention permits the operators in the field to efficiently repair the wall of a damaged tire adjacent to their field of operation, and hence avoid the additional expense of having to transfer the tires to a depot for repair.

It is an object of this invention to provide an apparatus which is portable and yet sufficiently sturdy to give the requisite support to the inflatable means which supply the pressure on the heated plug used to repair a fissure in tire walls.

It is a further object to provide apparatus that can be assembled easily and quickly to provide the requisite support to the inflatable pressure means on the heated plug used to repair a fissure in a tire wall, such apparatus being conveniently portable after dismantling.

It is a further object to provide apparatus of a portable nature which provides the requisite support to the inflatable pressure means on both sides of the wall of the tire against the heated plug used to repair fissures in the tire wall.

It is a further object to provide apparatus having inflatable pressure means at both ends of the heated plug used to repair a fissure in the tire wall.

The above and still further objects of the invention will become apparent upon study of the following detailed description of an embodiment of the invention, when taken in conjunction with the accompanying drawings, wherein:

FIGURE 1 is a perspective view of one preferred embodiment of the invention shown in position on a tire wall in need of repair;

FIGURE 2 is a cross section taken along the lines 2—2 of FIGURE 1 showing inflatable pads supported by the recessed plates;

FIGURE 3 is a cross section view showing an alternative configuration of the plates utilising inflatable pads provided with a supporting cover;

FIGURE 4 is an enlarged view partly cut away of the additional means of adjusting the pressure on the tire wall together with the clamps for ensuring the continued application of the pressure;

FIGURE 5 shows the detail of a toggle clamp;

FIGURE 6 is a cross section taken along the lines 5—5 of FIGURE 4;

FIGURE 7 shows an alternative arrangement for ensuring the continued application of pressure.

As shown in FIGURE 1 a member 10 terminates at one end in an arm 11 and in the other end in an arm 12; the arm 11 may be of somewhat shorter length than the arm 12 to facilitate the operation of the apparatus which will be described later. As shown in the broken section in FIGURE 1 the member 10 is preferably constructed of plate members 13 and 14 joined by shorter transverse members 15 and 16, all made of suitable structural steel. This type of construction reduces the weight of the apparatus at the same time providing the necessary structural strength.

A member 17 constructed in the same way as the member 10 has at one end an arm 18 and at the other end an arm 19, and in the event that the member 10 is constructed with arms 11 and 12 of unequal length, the arm 18 is correspondingly longer than the arm 19 so that the total length of both arms 12 and 19 corresponds with that of arms 11 and 18.

A plate 20 is secured by suitable means to a hollow member 21, and the end of the arm 11 is inserted into the member 21; the end of the arm 18 of the member 17 is inserted into a similar member 21 secured to a similar plate 20. The plates 20 each provide support for an inflatable air pressure bag 22 bearing against a heating pad 23 which will be in contact with the wall of the tire 24 when the apparatus is in use. In the preferred embodiment and as shown particularly in cross section in FIGURE 2, the plates 20 are each recessed to provide a wall to contain the flexible air pressure bags 22 on inflation.

The arms 12 and 19 of the members 10 and 17 respectively are inserted in a sleeve 25 so that the recesses on the plate 20 face each other. A rack 26 is secured to the outer edge of each of the arms 12 and 18 by suitable means, e.g. welding and as shown in FIGURE 4 the space between the outer edge of the sleeve 25 and the racks 26 is taken up by a bar 27 secured to the sleeve 25 by suitable means, e.g. welding. The bar 27 ensures the minimum of play between the racks 26 on the arms 12 and 19 with the sleeve 25.

To move the end of the arm 12 closer to the end of the arm 19, thus providing additional means to adjusting the pressure on the heating pads 23, various gear arrangements may be utilized; as shown in FIGURES 4 and 6 in one such arrangement a spur gear 28 traverses the sleeve 25 and cooperates with the rack 26 on the arm 12 to move it closer to the end of the arm 19.

Various arrangements may be used to maintain the member 17 in position while the spur gear 28 is being operated, as well as to maintain the members 10 and 17 in place once the requisite adjustment of relative position has taken place. To achieve these purposes one such arrangement is that shown in FIGURE 4 wherein toggle clamps 29 secured to the sleeve 25 are rotated by handles 30 so that their ends bear against clamp bars 31. As a result teeth on the abutment 32 pivotably attached to the clamp bars 31 move into engagement with the teeth of the racks 26. An alternative arrangement to achieve these purposes is shown in FIGURE 6 and this involves the provision of a series of holes 33 in the sleeve 25 co-operating with a similar series of holes 33a in the arms 12 and 19 through which pins 34 may be inserted when the holes 33 and 33a are in alignment.

To use the apparatus the members 10 and 17 are assembled by insertion in the sleeve 25; the members 21 carrying the plates 20 are then inserted over the ends of the arms 11 and 18. In the embodiment shown in FIGURE 1 the toggle clamp 29 is then rotated to bring the teeth on the pivoted abutment 32 into engagement with the teeth of the rack 26 on the arm 19. The air bags 22 carrying the heating pads 23 are then placed in position on the plates 20, the latter being then brought into the desired proximity by manually rotating the spur gear 28 co-operating with the rack 26 on the arm 12. The air bags 22 are then inflated, the heating pads 23 then exerting pressure against the plug in the wall of the tire 24 and further adjustment of pressure may be obtained by rotating the spur gear 28. To ensure that the heating pads 23 are held in place when the requisite pressure is attained, the handle 30 of the righthand toggle clamp 29 in rotated to bring the teeth on its abutment 32 into engagement with the teeth of the rack 26 on the arm 12. Power is then supplied to both heating pads 23 and the process of curing is set in motion. As a result of the use of opposed air bags 22 pressure is applied on both sides of the plug and as the material flows in the aperture this feature allows them to follow the movement of the plug.

As already mentioned the cross sectional view illustrated in FIGURE 2 shows plates 20 which are recessed with a view to containing the sideways movement of the bags 22 on inflation. However, an alternative arrangement is illustrated in FIGURE 3 wherein the bags 22 on inflation are themselves contained by a fabric cover 33; as a result of the use of such bags 22 the plates 20 may be contoured as shown in FIGURE 3 to conform more closely with the inside and outside contours of the tire 24, the fabric covered bags 22 being, of course, still flexible enough to conform to the contour of the plates 20.

While certain embodiments have been illustrated and described for the purpose of disclosure, it will be understood that the invention is not limited thereto, but contemplates such modifications and other embodiments as may be utilized without departing from the invention.

What we claim is:

1. Apparatus for curing a plug of uncured rubber positioned in an opening in a wall of a tire comprising, in combination, a pair of pads, means for heating said pads, a pair of inflatable vessels, first and second members each terminating in a depending pair of arms positioned in substantially the same plane, each of said members having a plate at one end with a face large enough to support one of said inflatable vessels placed thereon with one of said heating pads placed on said vessel, said members being positioned whereby the faces of said plates each carrying one of said inflatable vessels with one of said heated pads placed thereon oppose each other with the wall of said tire containing said plug interposed, means for inflating said vessels to apply pressure to said plug, adjustable means connecting the other ends of said members to vary the position apart of said plates on said members and means for securing each of said members in position.

2. Apparatus for curing a plug of uncured rubber positioned in an opening in a wall of a tire comprising, in combination, a pair of pads, means for heating said pads, a pair of inflatable vessels, first and second members each terminating in a depending pair of arms positioned in substantially the same plane, each of said members having a plate at one end with a face large enough to support one of said inflatable vessels placed thereon with one of said heating pads placed on said vessel, said members being positioned whereby the faces of said plates each carrying one of said inflatable vessels with one of said heated pads placed thereon oppose each other with the wall of said tire containing said plug interposed, the faces of said plates being recessed to contain said vessels on inflation, means for inflating said vessels to apply pressure to said plug, adjustable means connecting the other ends of said members to vary the position apart of said plates on said members and means for securing each of said members in position.

3. Apparatus for curing a plug of uncured rubber positioned in an opening in a wall of a tire comprising, in combination, a pair of pads, means for heating said pads, a pair of inflatable vessels, first and second members each terminating in a depending pair of arms positioned in substantially the same plane, each of said members having a plate at one end with a face large enough to support one of said inflatable vessels placed thereon with one of said heating pads placed on said vessel, said members being positioned whereby the faces of said plates each carrying one of said inflatable vessels with one of said heated pads placed thereon oppose each other with the wall of said tire containing said plug interposed, means for inflating said vessels to apply pressure to said plug, adjustable means connecting the other ends of said members to vary the position apart of said plates on said members, comprising a sleeve covering said other ends of said members, a rack secured to one of said arms at said other end and a spur gear carried by said sleeve co-operating with said rack to move said one of said arms and means for securing each of said members in position.

4. Apparatus for curing a plug of uncured rubber positioned in an opening in a wall of a tire comprising, in combination, a pair of pads, means for heating said pads, a pair of inflatable vessels, first and second members each terminating in a depending pair of arms positioned in substantially the same plane, each of said members having a plate at one end with a face large enough to support one of said inflatable vessels placed thereon with one of said heating pads placed on said vessel, said members being positioned whereby the faces of said plates each carrying one of said inflatable vessels with one of said heated pads placed thereon oppose each other with the wall of said tire containing said plug interposed, the faces of said plates being recessed to contain said vessels on inflation, means for inflating said vessels to apply pressure to said plug, adjustable means connecting the other ends of said members to vary the position apart of said plates on said members, comprising a sleeve covering said other ends of said members, a rack secured to one of said arms at said other end and a spur gear carried by said sleeve co-operating with said rack to move said one of said arms, and means for securing each of said members in position.

5. Apparatus for curing a plug of uncured rubber positioned in an opening in a wall of a tire comprising, in combination, a pair of pads, means for heating said pads, a pair of inflatable vessels, first and second members each terminating in a depending pair of arms positioned in substantially the same plane, each of said members having a plate at one end with a face large enough to support one of said inflatable vessels placed thereon with one of said heating pads placed on said vessel, said members being positioned whereby the faces of said plates each carrying one of said inflatable vessels with one of said heated pads placed thereon oppose each other with the wall of said tire containing said plug interposed, means for inflating said vessels to apply pressure to said plug, adjustable means connecting the other ends of said members to vary the position apart of said plates on said members and means for securing each of said members in position comprising a sleeve covering said other ends, a series of holes set in staggered relation both in said sleeve and said ends of said members and pins dimensioned to traverse aligned holes in said sleeve and said members.

6. Apparatus for curing a plug of uncured rubber positioned in an opening in a wall of a tire comprising, in combination, a pair of pads, means for heating said pads, a pair of inflatable vessels, first and second members each terminating in a depending pair of arms positioned in substantially the same plane, each of said members having a plate at one end with a face large enough to support one of said inflatable vessels placed thereon with one of said heating pads placed on said vessel, said members being positioned whereby the faces of said plates each carrying one of said inflatable vessels with one of said heated pads placed thereon oppose each other with the wall of said tire containing said plug interposed, means for inflating said vessels to apply pressure to said plug, adjustable means connecting the other ends of said members to vary the position apart of said plates on said members and means for securing each of said members in position comprising a sleeve covering said other ends of said members, a rack secured to each of said arms at said other ends, a spaced pair of toggle clamps each secured to said sleeve, said clamps having teeth movable towards and engageable with said racks.

7. Apparatus for curing a plug of uncured rubber positioned in an opening in a wall of a tire comprising, in combination, a pair of pads, means for heating said pads, a pair of inflatable vessels, first and second members each terminating in a depending pair of arms positioned in substantially the same plane, each of said members having a plate at one end with a face large enough to support one of said inflatable vessels placed thereon with one of said heating pads placed on said vessel, said members being positioned whereby the faces of said plates each carrying one of said inflatable vessels with one of said heated pads placed thereon oppose each other with the wall of said tire containing said plug interposed, the faces of said plates being contoured to conform to the shape of the tire wall, means for inflating said vessels to apply pressure to said plug, said pair of inflatable vessels being covered with a fabric material to contain their sideways movement normal to said arms, adjustable means connecting the other ends of said members to vary the position apart of said plates on said members and means for securing each of said members in position.

References Cited in the file of this patent

UNITED STATES PATENTS

| | | | |
|---|---|---|---|
| 348,818 | Baker | Sept. 7, | 1886 |
| 636,661 | Guest | Nov. 7, | 1899 |
| 1,084,489 | Schmutz | Jan. 13, | 1914 |
| 1,330,126 | Lisowski | Feb. 10, | 1920 |
| 1,692,675 | Markham | Nov. 20, | 1928 |
| 1,787,799 | Soule et al. | Jan. 6, | 1931 |
| 2,097,402 | Flassheim | Oct. 26, | 1937 |
| 2,421,098 | Vogt et al. | May 27, | 1947 |
| 2,421,101 | Lakso | May 27, | 1947 |
| 2,546,537 | Cain | Mar. 27, | 1951 |
| 2,814,073 | Van Scoyk | Nov. 26, | 1957 |
| 2,815,053 | Walker | Dec. 3, | 1957 |
| 2,837,767 | MacDonald | June 10, | 1958 |
| 2,882,774 | Guttfeld | Apr. 21, | 1959 |
| 2,889,579 | Hedge | June 9, | 1959 |
| 2,934,786 | Dupont | May 3, | 1960 |
| 2,991,505 | Van Scoyk | July 11, | 1961 |